United States Patent
Ganesan et al.

(10) Patent No.: US 12,117,973 B2
(45) Date of Patent: Oct. 15, 2024

(54) SERVER DEVICE UPDATES USING UPDATE BASELINES TAGGED ACROSS MULTIPLE MANAGEMENT CONSOLES

(71) Applicant: Dell Products L.P., Round Rock, TX (US)

(72) Inventors: Vaideeswaran Ganesan, Bangalore (IN); Pravin Janakiram, Bangalore (IN)

(73) Assignee: Dell Products L.P., Round Rock, TX (US)

(*) Notice: Subject to any disclaimer, the term of this patent is extended or adjusted under 35 U.S.C. 154(b) by 70 days.

(21) Appl. No.: 17/586,073

(22) Filed: Jan. 27, 2022

(65) Prior Publication Data
US 2023/0237027 A1 Jul. 27, 2023

(51) Int. Cl.
*G06F 8/65* (2018.01)
*G06F 8/71* (2018.01)
(Continued)

(52) U.S. Cl.
CPC .............. *G06F 16/21* (2019.01); *G06F 8/65* (2013.01); *G06F 8/71* (2013.01); *G06F 16/23* (2019.01); *G06F 16/252* (2019.01)

(58) Field of Classification Search
CPC ... G06F 16/21; G06F 8/65; G06F 8/71; G06F 16/23; G06F 16/252; G06F 11/3006;
(Continued)

(56) References Cited

U.S. PATENT DOCUMENTS

| | | | |
|---|---|---|---|
| 6,715,145 B1 * | 3/2004 | Bowman-Amuah | G06F 8/20 718/100 |
| 8,621,433 B2 * | 12/2013 | Back | G06F 8/71 717/169 |

(Continued)

OTHER PUBLICATIONS

Baseline and Configuration Drift Management Network Configuration Manager (/network-configuration-manager), pp. 1-8, https://www.solarwinds.com/network-configuration-manager/use-cases/baseline-config-drift-management, downloaded Jan. 26, 2022.
(Continued)

*Primary Examiner* — Daxin Wu
(74) *Attorney, Agent, or Firm* — Ryan, Mason & Lewis, LLP

(57) ABSTRACT

Techniques are provided for performing server device updates using update baselines that are tagged across multiple management consoles. One method comprises obtaining, by a first management console of multiple management consoles associated with a server device, a first update baseline comprising a first tag identifier, of multiple tag identifiers, that identifies a first update of a component of the server device across the multiple management consoles; and applying the first update baseline to the server device in a maintenance mode to update the component of the server device, wherein the server device is maintained in the maintenance mode when two or more of the tag identifiers are active in the server device following the application of the first update baseline. The server device can be restored from the maintenance mode when only one tag identifier is active in the server device following the application of the first update baseline.

20 Claims, 14 Drawing Sheets

(51) Int. Cl.
  *G06F 16/21*   (2019.01)
  *G06F 16/23*   (2019.01)
  *G06F 16/25*   (2019.01)
(58) Field of Classification Search
  CPC ... H04L 67/10; H04L 67/1097; H04L 41/046; H04L 41/40; H04L 41/082; H04L 41/0859
  See application file for complete search history.

(56) References Cited

U.S. PATENT DOCUMENTS

| | | | | |
|---|---|---|---|---|
| 8,713,146 | B2* | 4/2014 | Pedersen | G06Q 10/06 |
| | | | | 709/224 |
| 8,903,785 | B2* | 12/2014 | Charboneau | G06F 16/22 |
| | | | | 707/695 |
| 9,948,617 | B2* | 4/2018 | Wysocki | H04L 67/34 |
| 10,261,775 | B1* | 4/2019 | Ramsay | G06F 8/65 |
| 10,860,383 | B2* | 12/2020 | Debata | H04L 41/044 |
| 10,938,660 | B1* | 3/2021 | Kapur | H04L 41/0266 |
| 2006/0248162 | A1* | 11/2006 | Kawasaki | G06F 8/65 |
| | | | | 709/217 |
| 2012/0290824 | A1* | 11/2012 | Yardumian | H04L 67/02 |
| | | | | 713/1 |
| 2014/0082131 | A1* | 3/2014 | Jagtap | G06F 9/5027 |
| | | | | 709/217 |
| 2017/0230251 | A1* | 8/2017 | Dube | H04L 41/042 |
| 2019/0220285 | A1* | 7/2019 | Ali | G06F 9/4401 |
| 2022/0350642 | A1* | 11/2022 | Poddar | G06F 8/71 |

OTHER PUBLICATIONS

Update Baseline, Windows Deployment, Microsoft Docs, pp. 1-3, Sep. 17, 2021. https://docs.microsoft.com/en-us/windows/deployment/update/update-baseline.

3 Steps to Baselining Your IT Infrastructure, 6Fusion, pp. 1-7, https://6fusion.com/3-steps-baselining-infrastructure/, pp. 1-7. https://6fusion.com/3-steps-baselining-infrastructure/.

* cited by examiner

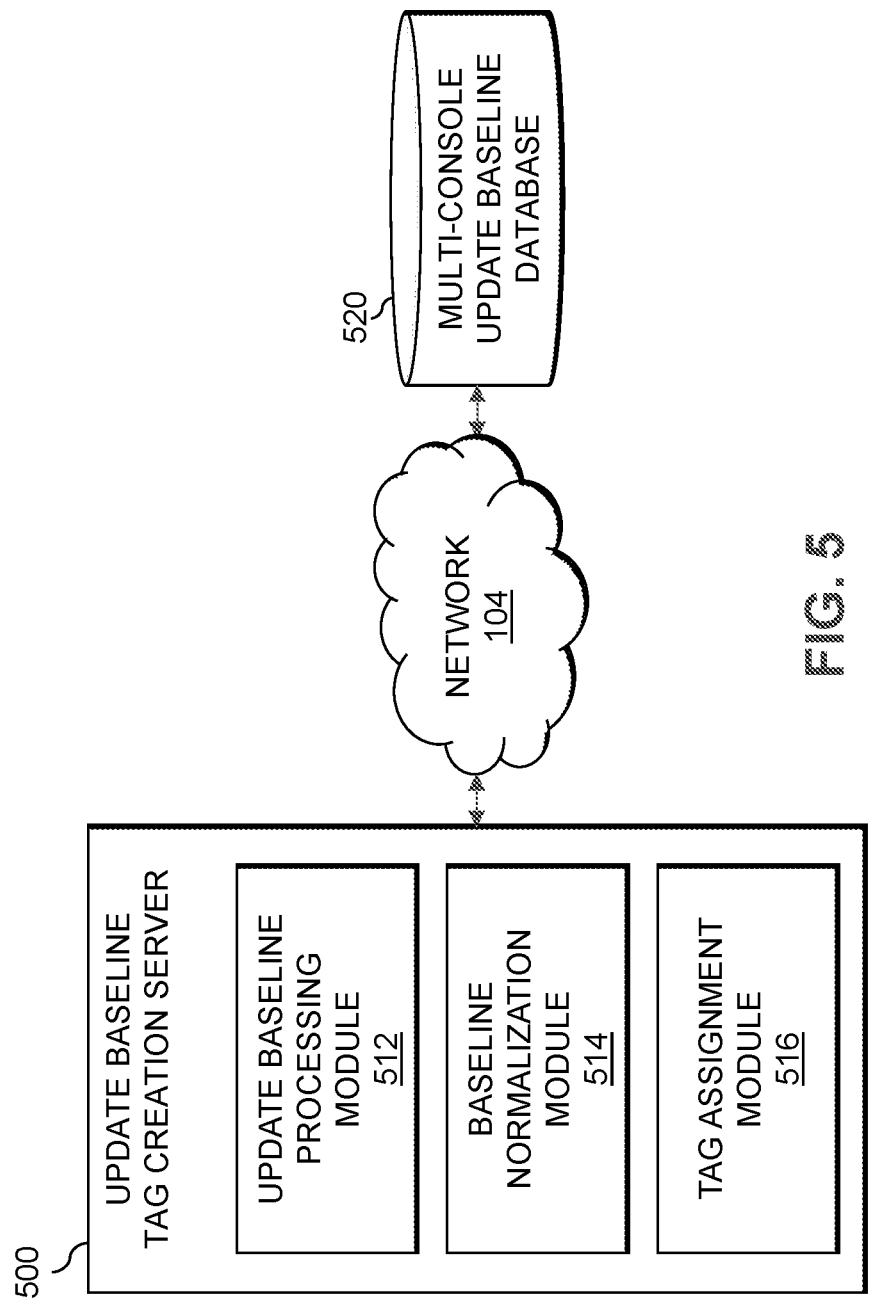

600

1. COLLECT BASELINES FROM DIFFERENT MANAGEMENT CONSOLES. FOR EACH BASELINE, COLLECT (I) FIRMWARE, DRIVER AND SOFTWARE COMPONENTS, AND RESPECTIVE VERSIONS, ASSOCIATED WITH THE BASELINE; AND (II) IDENTIFIERS FOR THE FIRMWARE, DRIVER AND SOFTWARE COMPONENTS;
2. USE THE IDENTIFIERS TO IDENTIFY COMMON ELEMENTS BETWEEN PAIRS OF BASELINES;
3. ORGANIZE AND RANK THE BASELINES BY REVIEWING THE VERSIONS FOR COMMON COMPONENTS;
4. RESOLVE CONFLICTING UPDATE BASELINES AND BASELINES WITH DEMOTED/NON-VALIDATED SOFTWARE COMPONENTS, AND RETIRE/REMOVE SUCH BASELINES WITH DEMOTED/NON-VALIDATED SOFTWARE COMPONENTS;
5. CREATE TAGS FOR MATCHING BASELINES AND ASSOCIATE SUCH TAGS IN THE CONSOLE;
6. APPLY THE UPDATES HAVING MATCHING TAGS IN THE TARGET ENVIRONMENT; AND
7. ORCHESTRATE UPDATES ACROSS THE INFRASTRUCTURE STACK USING THE CONSOLES; FOR EACH TAG: PLACE THE SYSTEM/CLUSTER INTO A MAINTENANCE MODE, AND CALL CONSOLES HAVING THE TAG IN A BASELINE TO APPLY THE BASELINE CORRESPONDING TO THAT TAG, AND RESTORE THE SYSTEM/CLUSTER FROM MAINTENANCE MODE TO AN OPERATIONAL MODE AS LONG AS MULTIPLE TAGS DO NOT EXIST FOLLOWING AN UPDATE.

FIG. 6

| OPENMANAGE ENTERPRISE BASELINE | MECM BASELINE | SCVMM UPDATE BASELINE | TAG | NOTES |
|---|---|---|---|---|
| Baseline 1<br>1002-200-200-3000, DRV, "1.0.0.1"<br>2002-200-200-3000, FRMW,<br>"8.0.0.1"<br>[ism1.0_product_id], "3.1.1"<br>2002-200-200-3000, DRV,<br>"10.0.0.1" | TAG-R740-20210602<br>1002-200-200-3000, DRV,<br>"1.0.0.1"<br>2002-200-200-3000, DRV,<br>"10.0.0.1" | SCBaseline1<br>1002-200-200-3000, DRV,<br>"1.0.0.1"<br>2002-200-200-3000, DRV,<br>"10.0.0.1" | T1-3 | 3 Baselines Match |
| Baseline 2<br>1004-200-200-3000, DRV, "1.0.0.1"<br>1004-200-200-3000, FRMW,<br>"8.0.0.1"<br>[ism1.0_product_id], "3.0.1"<br>2004-200-200-3000, DRV, "9.0.0.1" | TAG-R740xd-20210102<br>1004-200-200-3000, DRV,<br>"1.0.0.1"<br>2004-200-200-3000, DRV,<br>"9.0.0.1" | | T2-2 | 2 Baselines Match |
| Baseline 3<br>1004-200-200-3000, DRV, "2.0.0.1"<br>1004-200-200-3000, FRMW,<br>"9.0.0.1"<br>[ism1.0_product_id], "3.1.1"<br>2004-200-200-3000, DRV,<br>"10.0.0.1" | | | T3-1 | Baselines do not match and are assigned different tags. Create corresponding baselines in the other Console, or Select two tags and bring both to sync. |
| | TAG-R740xd-20210602<br>1002-200-200-3000, DRV,<br>"2.0.1.1"<br>2002-200-200-3000, DRV,<br>"10.0.0.1" | | T4-1 | |
| Baseline 4<br>1005-200-200-3000, DRV, "2.0.0.1"<br>1005-200-200-3000, FRMW,<br>"9.0.0.1"<br>[ism1.0_product_id], "3.1.1"<br>2005-200-200-3000, DRV,<br>"10.0.0.1" | TAG-R740xd-20210602<br>1005-200-200-3000, DRV,<br>"2.0.1.1"<br>1005-200-200-3000,<br>FRMW, "9.0.0.1"<br>[ism1.0_product_id], "3.1.1"<br>2005-200-200-3000, DRV,<br>"10.0.0.1" | SCBaseline2<br>1005-200-200-3000, DRV,<br>"2.0.0.1"<br>2005-200-200-3000, DRV,<br>"10.0.0.1" | T5-3 | 3 Baselines Match |

FIG. 7

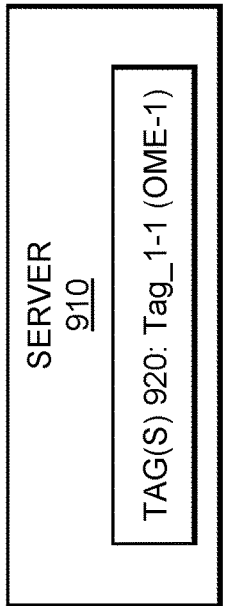
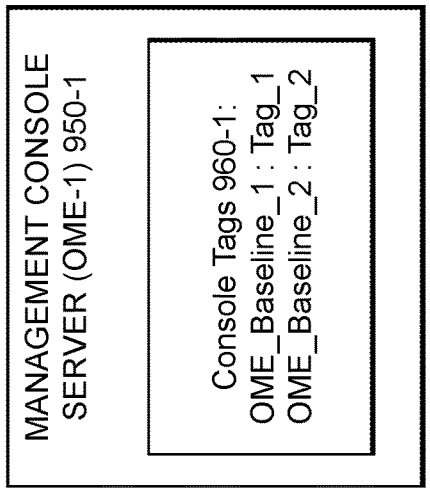
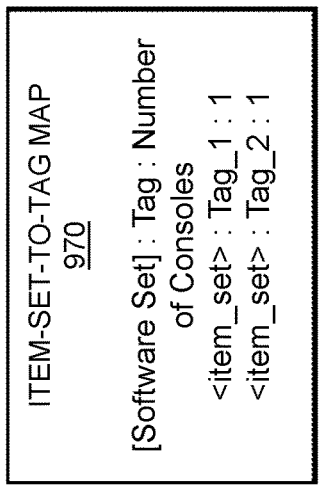
FIG. 9A
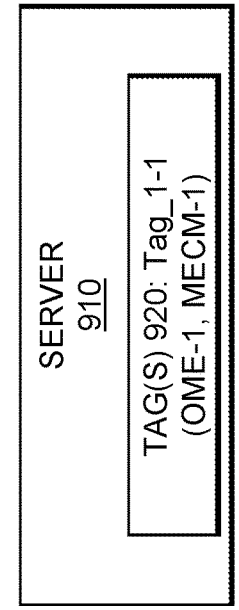
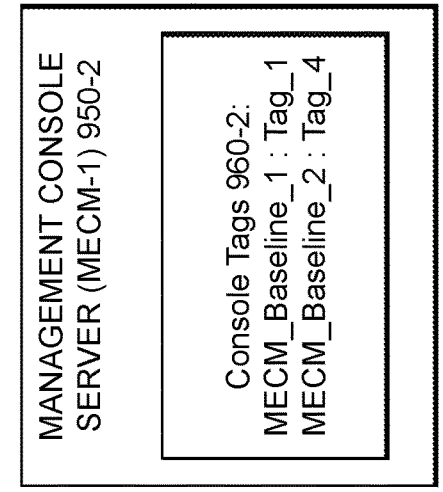
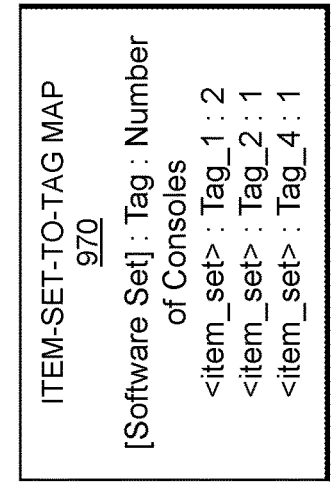
FIG. 9B

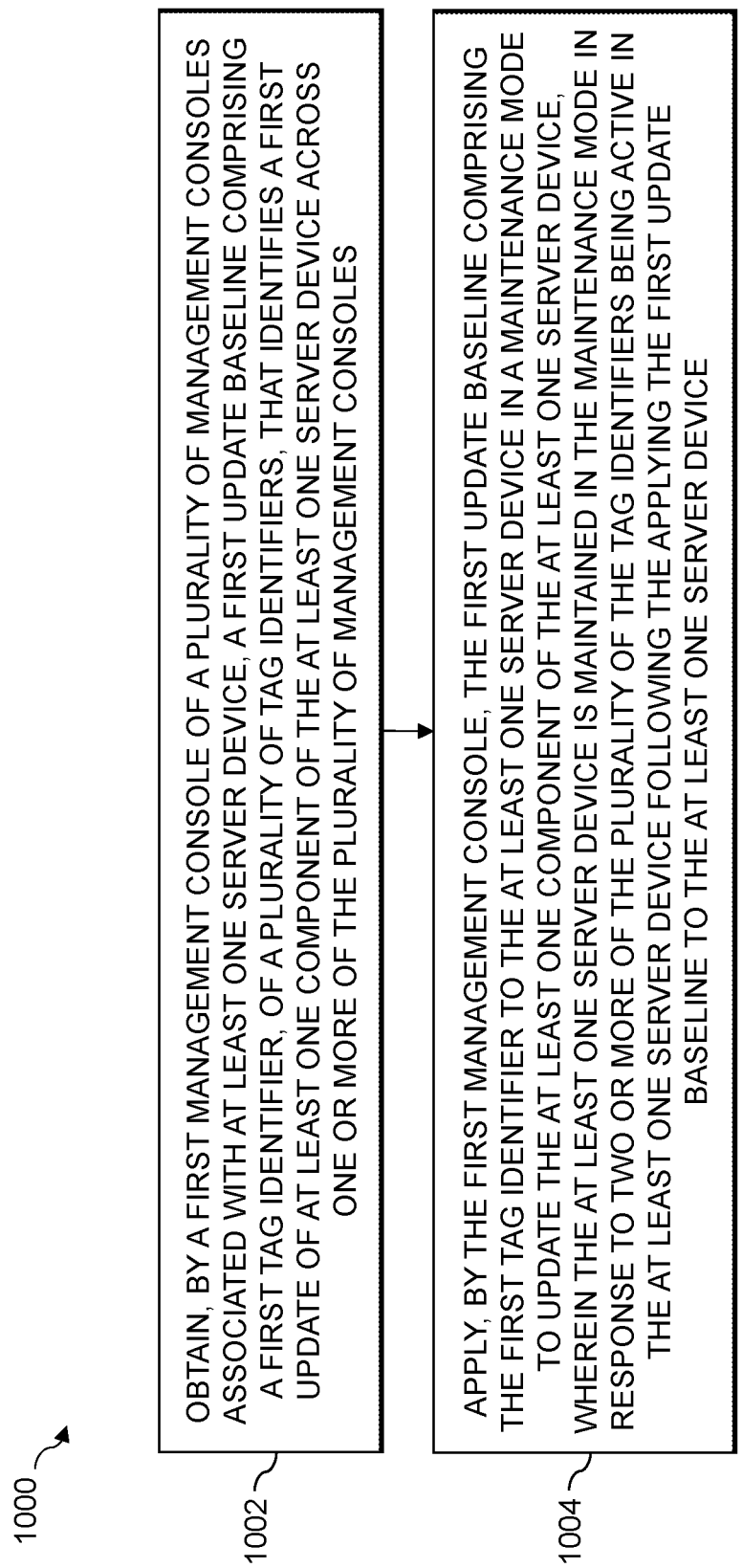

SERVER DEVICE UPDATES USING UPDATE BASELINES TAGGED ACROSS MULTIPLE MANAGEMENT CONSOLES

FIELD

The field relates generally to information processing systems, and more particularly to techniques for updating such information processing systems.

BACKGROUND

Infrastructure stacks, sometimes referred to as "full stacks," are often deployed in computing environments. An infrastructure stack comprises multiple layers of infrastructure elements, such as software elements, hardware elements and clusters of hardware elements, and often employs one or more management consoles for managing the infrastructure elements. For example, the infrastructure elements in an infrastructure stack may comprise software-defined storage elements, hyperconverged infrastructure, and various types of clusters. The management consoles allow multiple instances of a given infrastructure stack to be deployed and managed. Such infrastructure stacks can be problematic, particularly with regard to the manner in which updates of software, firmware and/or driver elements are processed and applied to one or more of the infrastructure elements of an infrastructure stack.

SUMMARY

In one embodiment, a method comprises obtaining, by a first management console of a plurality of management consoles associated with at least one server device, a first update baseline comprising a first tag identifier, of a plurality of tag identifiers, that identifies a first update of at least one component of the at least one server device across one or more of the plurality of management consoles; and applying, by the first management console, the first update baseline comprising the first tag identifier to the at least one server device in a maintenance mode to update the at least one component of the at least one server device, wherein the at least one server device is maintained in the maintenance mode in response to two or more of the plurality of the tag identifiers being active in the at least one server device following the applying the first update baseline to the at least one server device.

In some embodiments, the at least one server device may be restored from the maintenance mode in response to only one of the plurality of tag identifiers being active in the at least one server device following the applying the first update baseline. An identifier of each update baseline comprising the respective tag identifier and an identifier of a corresponding management console associated with the update baseline comprising the respective tag identifier may be stored for each tag identifier of the plurality of tag identifiers.

In one or more embodiments, the method further comprises, for a given tag identifier, placing the at least one server device in the maintenance mode; initiating each of the plurality of management consoles having an update baseline comprising the given tag identifier to apply the update baseline comprising the given tag identifier to the at least one server device; and restoring the at least one server device from the maintenance mode in response to only the given tag identifier being active in the at least one server device following the applying of the update baseline comprising the given tag identifier.

Other illustrative embodiments include, without limitation, apparatus, systems, methods and computer program products comprising processor-readable storage media.

BRIEF DESCRIPTION OF THE DRAWINGS

FIG. 5 illustrates an exemplary implementation of the infrastructure stack processing server of FIG. 1 as an update baseline tag creation server, in accordance with one embodiment;

FIG. 6 illustrates a tagged update baseline creation process that applies tags to the update baselines of multiple management console servers in accordance with an illustrative embodiment;

FIG. 7 is a sample table illustrating a tagged update baseline database configured to store tagged update baselines for multiple management console servers in accordance with an illustrative embodiment;

FIGS. 9A through 9D illustrate a number of sequential server device updates applied by multiple management console servers using the disclosed tagged update baselines, in accordance with at least one embodiment of the disclosure;

FIG. 10 is a flow chart illustrating an exemplary implementation of a server device update process that applies tagged update baselines associated with multiple management console servers to one or more server devices in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for performing server device updates using update baselines that are tagged across multiple management console servers.

Figure 1:
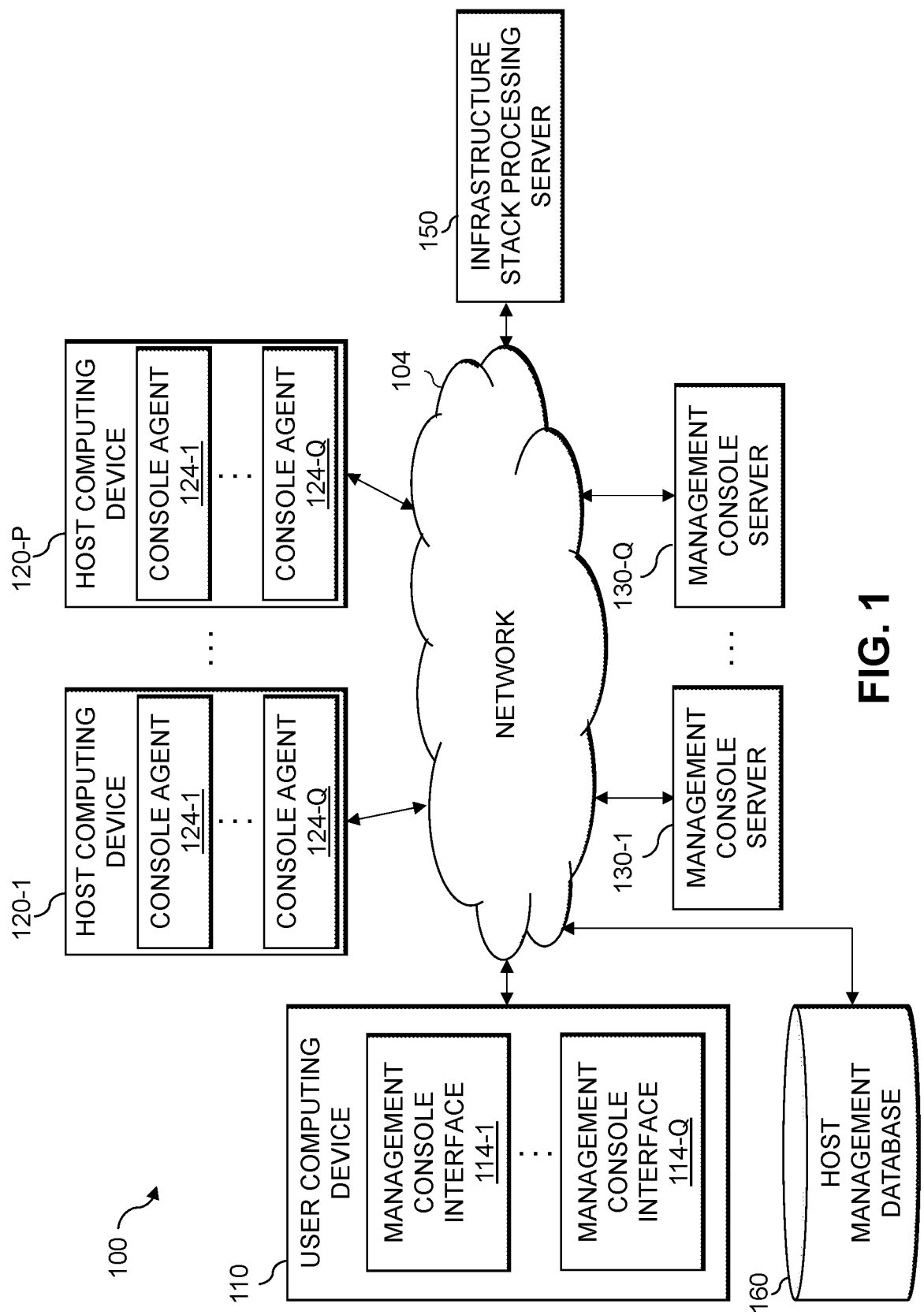
FIG. 1 illustrates an information processing system configured for performing server device updates using update baselines tagged across multiple management console servers in accordance with an illustrative embodiment.

FIG. 1 shows a computer network (also referred to herein as an information processing system) 100 configured in accordance with an illustrative embodiment. The computer network 100 comprises one or more user computing devices 110, a plurality of host computing devices 120-1 through 120-P, collectively referred to herein as host computing devices 120, a plurality of management console servers 130-1 through 130-Q, collectively referred to herein as management console servers 130, and one or more infrastructure stack processing servers 150. The user computing device 110, host computing devices 120, management console servers 130 and infrastructure stack processing server 150 are coupled to a network 104 in the example of FIG. 1, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The one or more user computing devices 110 may each be associated with, for example, an IT administrator, and may comprise, for example, devices such as mobile telephones, laptop computers, tablet computers, desktop computers or other types of computing devices (e.g., virtual reality (VR) devices or augmented reality (AR) devices). Some of these processing devices are also generally referred to herein as "computers." The user computing devices 110 may comprise a network client that includes networking capabilities such as ethernet, Wi-Fi, etc.

In the example of FIG. 1, the exemplary user computing device 110 comprises one or more management console user interfaces (UIs) 114-1 through 114-Q to interact with one or more of the management console servers 130, as discussed further below. It is noted that, in some embodiments, a given user computing device 110 may not require a management console UI 114 for each of the available management console servers 130. A representative management console server 130 is discussed further below in conjunction with FIG. 4. The one or more infrastructure stack processing servers 150 are discussed further below in conjunction with FIG. 5.

It is to be appreciated that the term "user" as used herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The host computing devices 120 may comprise, for example, server devices or other types of computers of an enterprise computer system, cloud-based computer system or other arrangement of multiple compute nodes associated with respective users. Such devices are examples of what are more generally referred to herein as "processing devices." Some of these processing devices are also generally referred to herein as "computers." The host computing devices 120 may comprise a network client that includes networking capabilities such as ethernet, Wi-Fi, etc.

For example, the host computing devices 120 in some embodiments illustratively provide compute services such as execution of one or more applications on behalf of each of one or more users associated with respective ones of the user computing devices 110. Such applications illustratively generate input-output (TO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The host computing devices 120 in some embodiments may comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

In the example of FIG. 1, the exemplary host computing devices 120 comprise one or more console agents 124-1 through 124-Q to interact with one or more of the management console servers 130. An exemplary implementation of a representative host computing device 120 is discussed further below in conjunction with FIG. 3. It is noted that, in some embodiments, a given host computing device 120 may not require a console agent 124 for each of the available management console servers 130.

One or more of the user computing devices 110, host computing devices 120, management console servers 130, and/or infrastructure stack processing servers 150 illustratively comprise processing devices of one or more processing platforms. For example, a representative infrastructure stack processing server 150 can comprise one or more processing devices each having a processor, a memory and a network interface, possibly implementing virtual machines and/or containers, although numerous other configurations are possible. The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements. The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more of the user computing devices 110, host computing devices 120, management console servers 130, and/or infrastructure stack processing servers 150 can additionally or alternatively be part of edge infrastructure and/or cloud infrastructure such as an Amazon Web Services (AWS) system. Other examples of cloud-based systems that can be used to provide at least portions of the user computing devices 110, host computing devices 120, management console servers 130, and/or infrastructure stack processing servers 150 include Dell Cloud, Google Cloud Platform (GCP) and Microsoft Azure.

Additionally, one or more of the user computing devices 110, the host computing devices 120, the management console servers 130 and/or the infrastructure stack processing server 150 can have one or more associated host management databases 160. Although the management information is stored in the example of FIG. 1 in a single host management database 160, in other embodiments, an additional or alternative instance of the host management database 160, or portions thereof, may be incorporated into portions of the system 100.

The one or more host management databases 160 may be configured to store, for example, update baselines, vulnerability catalogs, update catalogs, attribute registries and/or workflow databases, portions thereof and/or multiple instances of any of the foregoing, as discussed further below. The host management database 160 may be accessed, for example, in connection with managing one or more of the host computing devices 120.

The one or more host management databases 160 can be implemented using one or more storage systems associated with the respective devices 110, 120, 130 and/or 150. Such storage systems can comprise any of a variety of different types of storage including such as network-attached storage (NAS), storage area networks (SANs), direct-attached storage (DAS) and distributed DAS, as well as combinations of these and other storage types, including software-defined storage.

The storage devices in such storage systems illustratively comprise solid state drives (SSDs). Such SSDs are implemented using NVM devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

One or more of the user computing devices 110, host computing devices 120, management console servers 130 and/or infrastructure stack processing server 150 may be implemented on a common processing platform, or on separate processing platforms. The host computing devices 120 are illustratively configured to write data to and read data to/from a storage system in accordance with applications executing on those host devices for system users. One or more of the user computing devices 110, host computing devices 120, management console servers 130 and/or infrastructure stack processing server 150 may be implemented, for example, on the cloud or on the premises of an enterprise or another entity.

The host computing devices 120 are configured to interact over the network 104, for example, with one or more of the management console servers 130 and/or storage devices. Such interaction illustratively includes generating IO operations, such as write and read requests, and sending such requests over the network 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host computing devices 120 and a storage system to reside in different data centers. Numerous other distributed implementations of the host devices and storage systems are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the user computing devices 110, the host computing devices 120, the management console servers 130 and/or the infrastructure stack processing server 150 can be one or more input-output devices (not shown), which illustratively comprise keyboards, displays or other types of input-output devices in any combination. Such input-output devices can be used, for example, to support one or more user interfaces to such devices 110, 120, 130 and/or 150, as well as to support communication between such devices 110, 120, 130 and/or 150 and other related systems and devices not explicitly shown.

It is to be appreciated that this particular arrangement of elements in the user computing devices 110, the host computing devices 120 and/or the management console servers 130 of the FIG. 1 embodiment is presented by way of example only, and alternative arrangements can be used in other embodiments. For example, the functionality associated with at least some of the management console UIs 114-1 through 114-Q and/or console agents 124-1 through 124-Q in other embodiments can be implemented as a single element or device; separated across a larger number of elements; and/or implemented using multiple distinct processors. At least portions of such elements may be implemented at least in part in the form of software that is stored in memory and executed by a processor.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

It is to be understood that the particular set of elements shown in FIG. 1 for performing server device updates using tagged update baselines is presented by way of illustrative example only, and in other embodiments additional or alternative elements may be used. Thus, another embodiment includes additional or alternative systems, devices and other network entities, as well as different arrangements of modules and other components.

Figure 2:
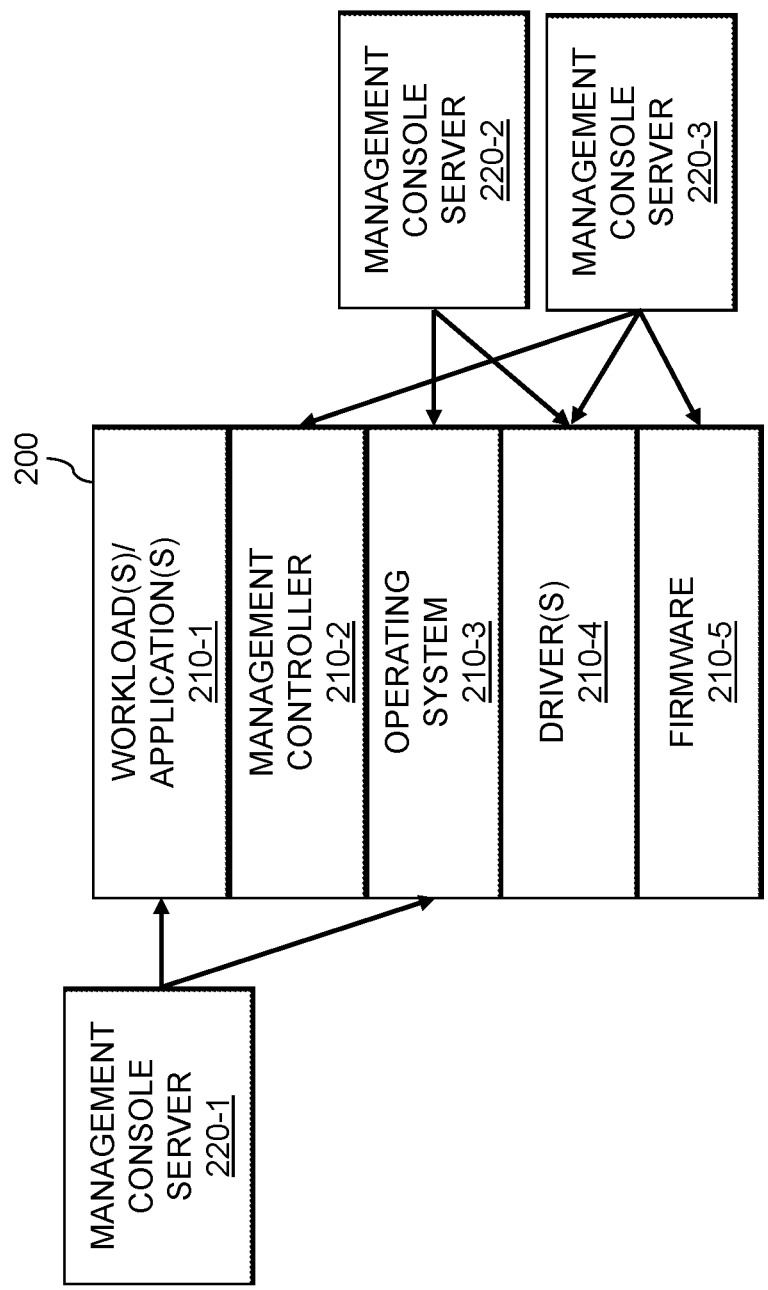
FIG. 2 illustrates an exemplary infrastructure stack related to the information processing system of FIG. 1 in accordance with an illustrative embodiment.

FIG. 2 illustrates an exemplary infrastructure stack 200 related to the information processing system of FIG. 1 in accordance with an illustrative embodiment. In the example of FIG. 2, the infrastructure stack 200 comprises a plurality of stack layers 210-1 through 210-5, such as a workloads or applications layer 210-1; a management controller layer 210-2, an operating system layer 210-3; a driver layer 210-4; and a firmware layer 210-5. The exemplary infrastructure stack 200 is managed by a plurality of management console servers 220-1 through 220-3. Each management console server 220 manages one or more layers of the infrastructure stack 200. In addition, in some embodiments, multiple management console servers 220 may manage at least some of the infrastructure elements in the same layer 210. In the example of FIG. 2, the management console server 220-1 and the management console server 220-2 both manage at least some of the infrastructure elements in the operating system layer 210-3 (potentially causing one or more inconsistencies).

In at least some embodiments, each layer 210 of the infrastructure stack 200 may have different attribute registries than other layers 210, and each layer 210 may have a different attribute registry for each technology variation (for example, a corresponding attribute registry may be provided by the provider of a given technology on each layer 210).

For example, an OpenManage Enterprise (OME) management console may employ update baselines (e.g., for firmware, driver and management controller updates in layers 210-5, 210-4 and 210-2, respectively) that are created using various catalogs. In addition, an SCVMM (System Center Virtual Machine Manager) management console may employ update baselines (e.g., for drivers and operating system updates in layers 210-4 and 210-3, respectively) such as SCBaselines and Driver Pack Baselines that are used for applying software/operating system updates and driver updates. Further, an MECM (Microsoft Endpoint Configuration Manager) console may employ update baselines (e.g., for drivers and operating system updates in layers 210-4 and 210-3, respectively, that are derived from WSUS (Windows Server Update Server) packages.

Figure 3:
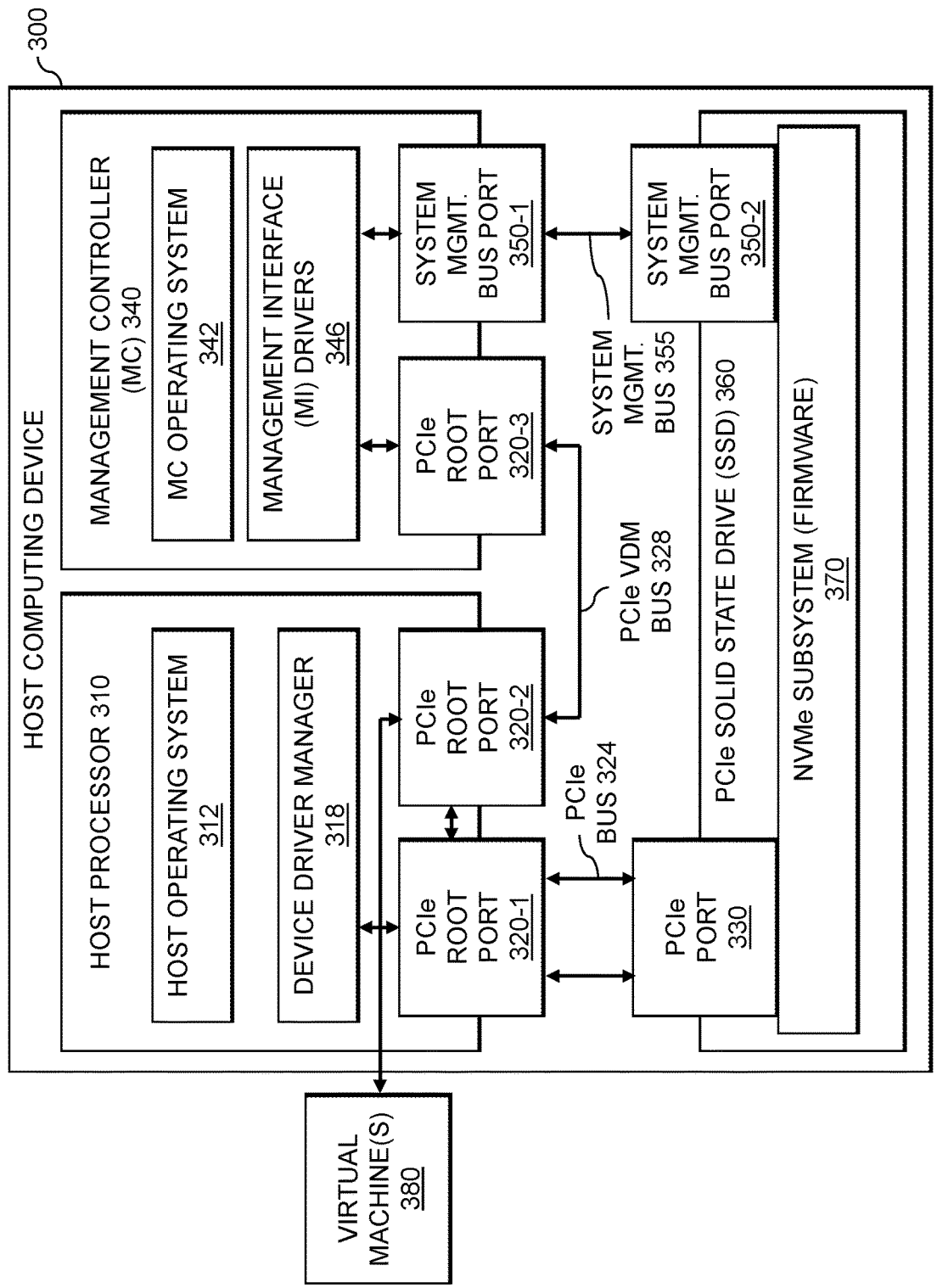
FIG. 3 illustrates an exemplary host computing device of FIG. 1 in further detail in accordance with an illustrative embodiment.

FIG. 3 illustrates an exemplary host computing device 300 in accordance with an illustrative embodiment. In the example of FIG. 3, the exemplary host computing device 300 comprises a host processor 310, a management controller (MC) 340 and a PCIe (Peripheral Component Interconnect Express) SSD 360. The exemplary host processor 310 comprises a host operating system 312 and a device driver manager 318 that comprises and manages one or more device drivers, such as an NVMe device driver (not specifically shown in FIG. 2). Such drivers may be configured, secured and/or updated in accordance with some embodiments of the disclosure, as discussed further below.

In addition, the host processor 310 comprises two PCIe root ports 320-1 and 320-2 for communicating with a PCIe port 330 of the PCIe SSD 360 and a PCIe root port 320-3 of the management controller 340, respectively. The PCIe root port 320-1 communicates with the PCIe port 330 of the PCIe SSD 360 using a PCIe bus 324. The PCIe root port 320-2 communicates with the PCIe root port 320-3 of the management controller 340 using a PCIe VDM (Vendor Defined Message) bus 328 that channelizes the information to the management controller 340.

In one or more embodiments, the exemplary management controller 340 further comprises an MC operating system 342 and one or more management interface (MI) drivers 346, such as an NVMe-MI driver (not specifically shown in FIG. 3). The management interface drivers 346 each comprise a command set and architecture for managing respective firmware, such as NVMe firmware, to discover, monitor, configure, and update firmware in multiple operating environments.

The exemplary management controller 340 also comprises a system management bus port 350-1 that communicates with a system management bus port 350-2 of the PCIe SSD 360 using a system management bus 355 based on a serial communication protocol. The management controller 340 may be implemented, for example, as a baseboard management controller (BMC), such as the Integrated Dell Remote Access Controller (iDRAC), commercially available from Dell Technologies, or another out of band (OOB) controller.

In some embodiments, the exemplary host computing device 300 hosts one or more virtual machines 380 that communicate with at least portions of the exemplary host computing device 300 using the PCIe root port 320-2. For example, a given virtual machine 380 may directly request the management controller 340 (such as a BMC or an iDRAC) to update firmware (potentially bypassing the host operating system 312 and/or the drivers using a passthrough channel).

The exemplary PCIe SSD 360 is one example of a component of the exemplary host computing device 300 comprising firmware. As shown in the example of FIG. 3, the PCIe SSD 360 further comprises an NVMe subsystem 370 as an example of firmware that may be configured, secured and/or updated in accordance with some embodiments of the disclosure, as discussed further below.

Figure 4:
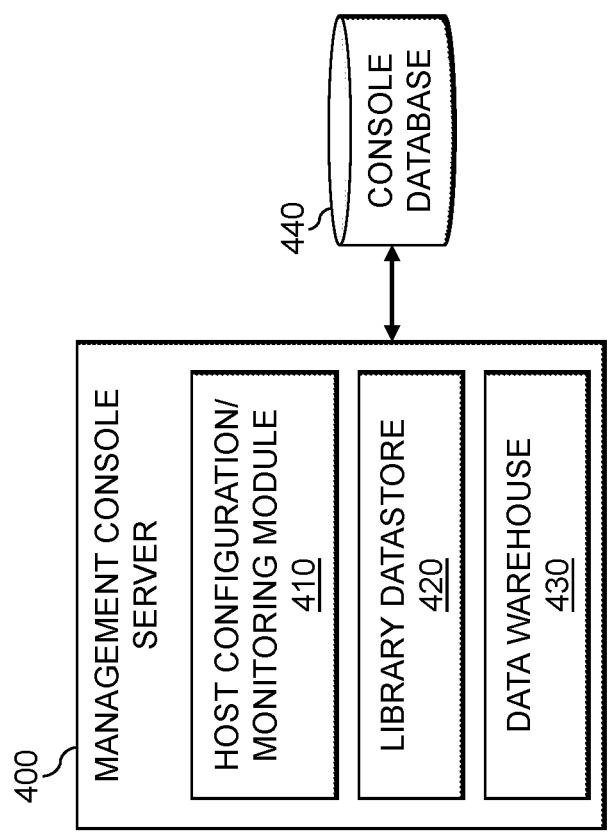
FIG. 4 illustrates an exemplary management console server of FIG. 1 in further detail in accordance with an illustrative embodiment.

FIG. 4 illustrates an exemplary management console server 400 in further detail in accordance with an illustrative embodiment. In the example of FIG. 4, the management console server 400 comprises a host configuration/monitoring module 410, a library datastore 420, and a data warehouse 430. A given management console server 400 may span (e.g., control) multiple clusters of the host computing devices 120 of FIG. 1.

The host configuration/monitoring module 410, in one or more embodiments, is configured to perform one or more functions for configuring, updating and/or monitoring one or more of the host computing devices 120 or other devices in the system 100 of FIG. 1. One or more of the management console servers 400 may be implemented in some embodiments, using an OpenManage Enterprise (OME) console, an SCVMM (System Center Virtual Machine Manager) console and/or an MECM (Microsoft Endpoint Configuration Manager) console.

In at least some embodiments, the management console server 400 can have one or more associated console databases 440 configured to store console data, such as information related to devices, update baselines, monitoring data (e.g., alerts and/or health status), and configuration data (e.g., configuration data related to clusters). Although the console information is stored in the example of FIG. 4 in a single console database 440, in other embodiments, an additional or alternative instance of the console database 440, or portions thereof, may be incorporated into portions of the system 100 of FIG. 1.

The library datastore 420 is configured in some embodiments to store, for example, operating system images, applications, patches and driver versions.

The data warehouse 430 is configured in some embodiments to store, for example, data from the console database 440 that has been pushed to the data warehouse 430, for example, for reporting purposes.

One or more aspects of the disclosure recognize that multiple management console servers 400 may control some overlapping portions of a given host computing device 120. Updates to an overlapping infrastructure element that can be updated from different layers of an infrastructure stack (e.g., using multiple different management console servers), however, such as for drivers, as shown in FIG. 2, can result in an undesirable (e.g., possibly inconsistent) state in a target deployment.

Thus, in some embodiments, server device update techniques are provided that use update baselines that are tagged across multiple management console servers 400 to ensure consistency in the updates. The term "update baseline" as used herein is intended to be broadly construed so as to encompass, for example, a defined and/or verified set of versions of software, firmware and/or drivers that can be applied to one or more infrastructure elements in a given layer of an infrastructure stack. In addition, validated solution environments, such as an Azure Stack HCI operating system environment, may have stronger consistency needs between firmware and drivers (e.g., since the entire set is typically validated by the hardware, operating system and stack vendors). Inconsistent updates across the various elements of the infrastructure stack could result in an invalid or otherwise undesirable target environment.

Conflicting updates that are applied to an infrastructure stack can cause a number of problems. For example, when driver updates are installed, all driver updates from multiple versions of a given driver can coexist inside the operating system. The particular driver that is loaded during an update, however, is dependent on the particular operating system. Microsoft, for example, loads the latest driver update. Thus, if there are two different update baselines, each pointing to two different versions of a given driver, and both baselines are applied to the given driver, then only the latest driver is loaded by a Microsoft operating system upon a reboot.

In addition, for installers based on the Microsoft Installer (MSI), downgrades typically fail. Thus, the latest MSI updates will exist in the infrastructure stack. Further, for installers based on the RPM Package Manager (RPM) package management system, downgrades also typically fail without the specific downgrade option. Thus, the end state in a given system deployed from the infrastructure stack is unpredictable and depends on how the update is applied.

In addition, conflicting driver updates can be created in update baselines due to the update baselines being created at different points in time. A customer may validate an update baseline in their environment and choose specific versions of drivers based on their usage and known issues. Typically, when customers receive factory-shipped servers, they may downgrade firmware to a known version of firmware. In addition, a given vendor could have demoted updates (sometime after the release of the update). This is possible, for example, when there is a break fix in the patch and the vendor chooses to demote the update. Thus, the update version in the latest catalog reverts to an older version. Therefore, it may be possible that an older baseline has a version that is demoted.

One or more embodiments of the disclosure ensure that updates are consistently applied across multiple layers of a given infrastructure stack and across multiple management console servers. In some infrastructure stacks, only certain combinations of versions of infrastructure elements, such as drivers and/or firmware, are allowed. Thus, update baselines for the various layers of the infrastructure stack should be aligned to the same combinations. In this manner, when performing updates to one or more layers of an infrastructure stack, the entire infrastructure stack is updated in a consistent manner.

FIG. 5 illustrates an exemplary implementation of the infrastructure stack processing server 150 of FIG. 1 as an update baseline tag creation server 500, in accordance with one embodiment. The exemplary update baseline tag creation server 500 may generate one or more tagged update baselines for performing consistent server device updates across multiple management console servers 130.

In the example of FIG. 5, the update baseline tag creation server 500 comprises an update baseline processing module 512, a baseline normalization module 514, and a tag assignment module 516. The update baseline processing module 512 may be configured to apply one or more tagged update baselines to one or more of the host computing devices 120 in a maintenance mode, as discussed further below. The baseline normalization module 514 may be configured to perform a normalization of one or more update baselines, as discussed further below, for example, in conjunction with FIG. 8. The tag assignment module 516 may be configured to tag one or more update baselines, as discussed further below, for example, in conjunction with FIG. 8.

It is to be appreciated that this particular arrangement of modules 512, 514, 516 illustrated in the update baseline tag creation server 500 of FIG. 5 is presented by way of example only, and alternative arrangements can be used in other embodiments. For example, the functionality associated with elements 512, 514, 516 in other embodiments can be implemented as a single element or device, or separated across a larger number of elements. As another example, multiple distinct processors can be used to implement different ones of elements 512, 514, 516, or portions thereof.

At least portions of elements 512, 514, 516 may be implemented at least in part in the form of software that is stored in memory and executed by a processor. An exemplary process utilizing elements 512, 514, 516 of the update baseline tag creation server 500 of FIG. 5 will be described in more detail with reference to, for example, FIGS. 6 and 8.

The exemplary update baseline tag creation server 500 can have one or more associated multi-console update baseline databases 520 configured to store, for example, one or more update baselines for a plurality of the management console servers 400. Although the update baseline information is stored in the example of FIG. 5 in a single multi-console update baseline database 520, in other embodiments, an additional or alternative instance of the multi-console update baseline database 520, or portions thereof, may be incorporated into portions of the system 100.

The one or more multi-console update baseline databases 520 may be accessed, for example, in connection with a tag assignment process that assigns tags to the update baselines of the multiple management console servers 400 and/or an update of one or more of the host computing devices 120 using the tagged update baselines.

FIG. 6 illustrates a tagged update baseline creation process 600 that applies tags to the update baselines of multiple management console servers for deployment of updates across an infrastructure stack, in accordance with an illustrative embodiment. In the example of FIG. 6, the tagged update baseline creation process 600 comprises the following steps:

1. Collect baselines from different management console servers 400 associated with an infrastructure stack. For each baseline, collect: the firmware, driver and software components (and their versions). In addition, a universal (e.g., industry standard) identifier is also collected for each component, such as a PnP ("plug and play") identifier or a specific device identifier for drivers (such as device identification strings for Windows drivers, a product identifier for elements associated with an MSI installer, or a package identifier for elements associated with an RPM installer).

2. Use the identifiers to identify the common elements between any two baselines (e.g., within a console or across consoles).

3. Organize and rank the baselines by reviewing the versions for common components. Baselines can be ranked within a console from the latest to the oldest, for example. The baselines can be organized across consoles using labels, such as "Match," "Higher," "Lower," and "Conflicting." In this manner, update baselines are ranked and aligned across multiple different management console servers 400 based on their common components. In at least some embodiments, a match occurs when the common components have the same version. A higher baseline occurs when the baseline has all components with version numbers higher than or equal to the other baseline. A lower baseline occurs when the baseline has all components with version numbers lower than or equal to the other baseline. A conflicting baseline occurs when common components have conflicting matches. The detected baseline conflicts (e.g., conflicting update components) can be used to reconcile baselines across multiple management console servers 400. To simplify the processing, some embodiments may first sort the baselines according to a reverse creation/modification timestamp. The latest baseline will typically be higher than older baselines.

4. Resolve conflicting update baselines and baselines with demoted/non-validated software components. Such baselines can be retired and/or removed in some embodiments. Baselines that have non-demoted and validated software components are retained. When removing baselines, the matching baselines can be across the management console servers 400. Thus, in at least some embodiments, a baseline that matches another baseline that has been marked for removal should also be removed. The disclosed techniques for infrastructure stack update identify and remove demoted components across different console update baselines.

5. Create tags for matching baselines and associate such tags in the management console servers 400. Existing fields (e.g., "Description") can be updated to include the tags for matching baselines. It may be possible in some implementations that a baseline can match multiple baselines in a different console. If tags are missing in another management console server 400, the infrastructure stack update process 600 can optionally create them with similar names, so that consistent updates of the infrastructure stack are possible.

6. Apply the updates having matching tags in the target environment (e.g., by an IT administrator). One possible mechanism records the tag inside the system corresponding to the console baseline (such as in an operating system credential store or in a BMC (Baseboard Management Controller) and/or an iDRAC (Integrated Dell Remote Access Controller) storage). If the system is in a maintenance mode, it can allow multiple tags to coexist. However, in order to move the system into an operational mode, only one tag should be present in the system, as discussed further below in conjunction with FIGS. 9A through 9D. This ensures in some embodiments that the stack has the right and consistent updates across the infrastructure stack.

7. Orchestrate updates across the infrastructure stack using the management console servers 400. Given a tag, the update orchestration performed by the infrastructure stack update process involves putting the system/cluster into a maintenance mode, and then calling participating management console servers 400 (e.g., management consoles having a tag in the baseline) to apply the baseline corresponding to that tag, possibly rebooting at the end, and finally restoring the system/cluster from the maintenance mode. The disclosed tag-based update orchestration, at least in some embodiments, enables orchestration across multiple management consoles in an infrastructure stack and/or ensures consistent updates in multiple layers of the infrastructure stack.

Using the disclosed techniques for infrastructure stack updates, customers using one or more VxRail hyper-converged infrastructure appliances can have the software infrastructure stack components (such as vCenter, Windows Admin Center and WSUS) in their environment. VxRail can create a tag corresponding to the baselines for all of the consoles participating in the infrastructure stack, while performing validation at the vendor premises. This tagged baseline catalog can then be published as a full stack catalog. The customer can leverage the update orchestration to orchestrate the update against the published tagged baseline catalog. In this manner, customers can leverage some of the existing practices in the customer environment, while also avoiding the need for downloading the full stack component bundle into the datacenter. To prevent misuse of a validated tag catalog, the tagged catalog can be encrypted and then decrypted by the update orchestration process before the tagged catalog is applied to the target environment.

FIG. 7 is a sample table illustrating a tagged update baseline database 700 configured to store tagged update baselines for multiple management console servers 400 in accordance with an illustrative embodiment. In the example of FIG. 7, the tags are associated with matching baselines from three different exemplary management console servers 400 (e.g., OME, MECM and SCVMM consoles) according to an embodiment. In some embodiments, the tags in the example of FIG. 7 are sorted by version number and each subsequent tag supersedes the prior tag. For example, for the tag T1 in FIG. 7, all three consoles have matching baselines (e.g., the three consoles have at least some matches in the respective baseline). The tag T1 is a union of the baselines of the three consoles.

Figure 8:
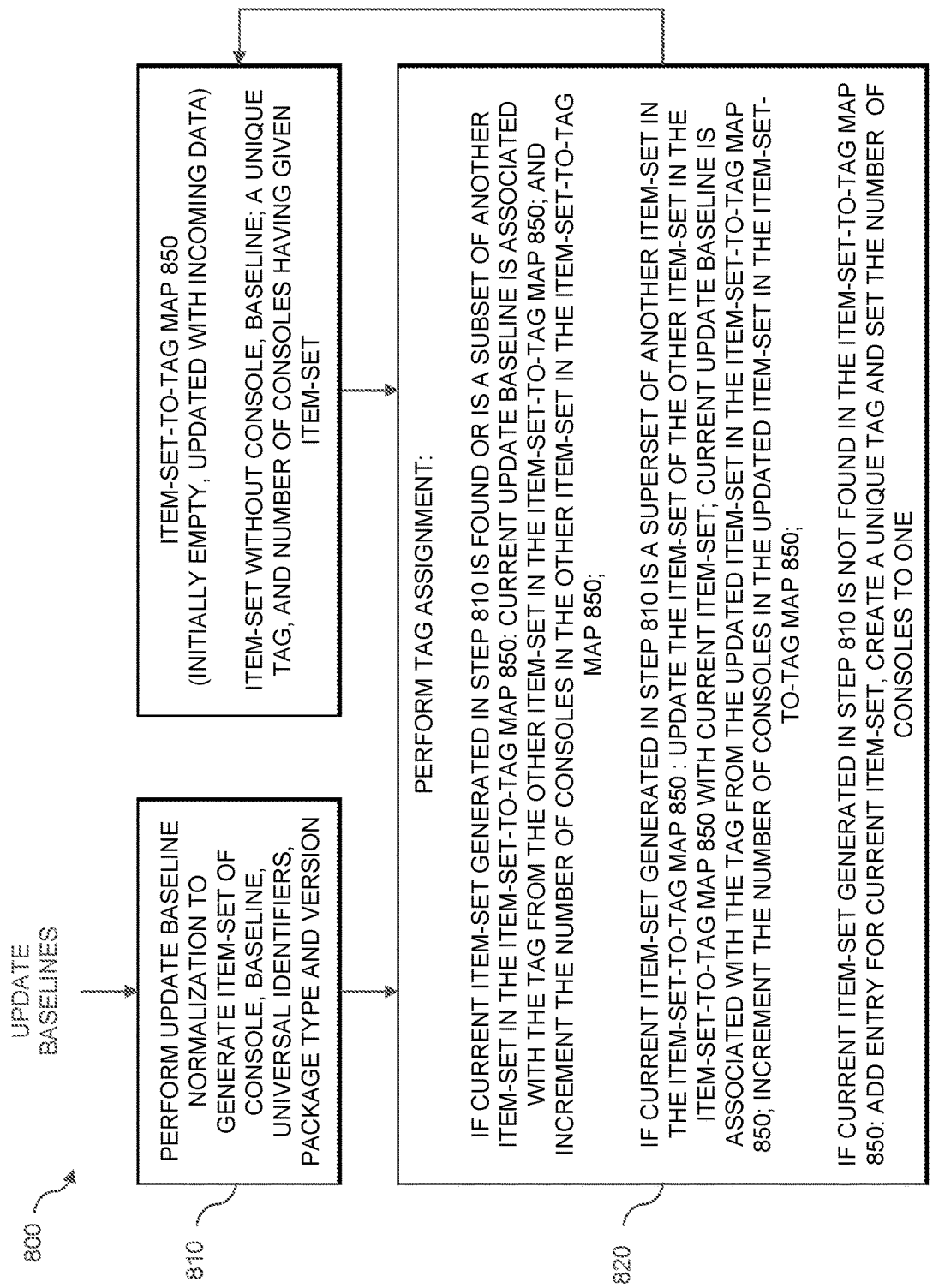
FIG. 8 illustrates a tag assignment process that assigns tags to the update baselines of multiple management console servers in accordance with an illustrative embodiment.

FIG. 8 illustrates a tag assignment process 800 that assigns tags to the update baselines of multiple management console servers in accordance with an illustrative embodiment. In at least some embodiments, the created tags are used to distinguish and provide consistent update baselines across multiple management consoles. In the example of FIG. 8, the tag creation is performed across multiple management consoles. An update baseline normalization processes catalogs and baselines from consoles and provides an item-set comprising console, baseline, universal identifiers, package type and version. The item-set is a baseline of each component and corresponding versions.

In the example of FIG. 8, the tag assignment process 800 processes one or more update baselines from one or more sources, such as catalogs and/or baselines from one or more management console servers 400). The update baselines are normalized in step 810 to generate an Item-Set comprising an identifier of the management console server 400, the baseline, one or more universal component identifiers, package type and version.

A tag assignment process is then performed in step 820 with the normalized update baselines (e.g., item-sets for each update baseline) and an item-set-to-tag map 850 (that is initially empty, and is updated with incoming data as item-sets are processed). If an item-set generated in step 810 is found (or is a subset of another item-set in the item-set-to-tag map 850): then the current update baseline is associated with the tag from the other item-set; and the number of consoles in the item-set-to-tag map 850 is incremented. If the item-set is a superset of another item-set in the item-set-to-tag map 850: then, update the item-set of the other item-set in the item-set-to-tag map 850 with the current item-set; the current update baseline is associated with the tag from the updated item-set in the item-set-to-tag map 850; and increment the number of consoles in the item-set-to-tag map. If the current item-set is not found in the item-set-to-tag map 850: then, add an entry for the current item-set, create a unique tag and set the number of consoles (e.g., management console servers 400) to one.

Figure 9C:
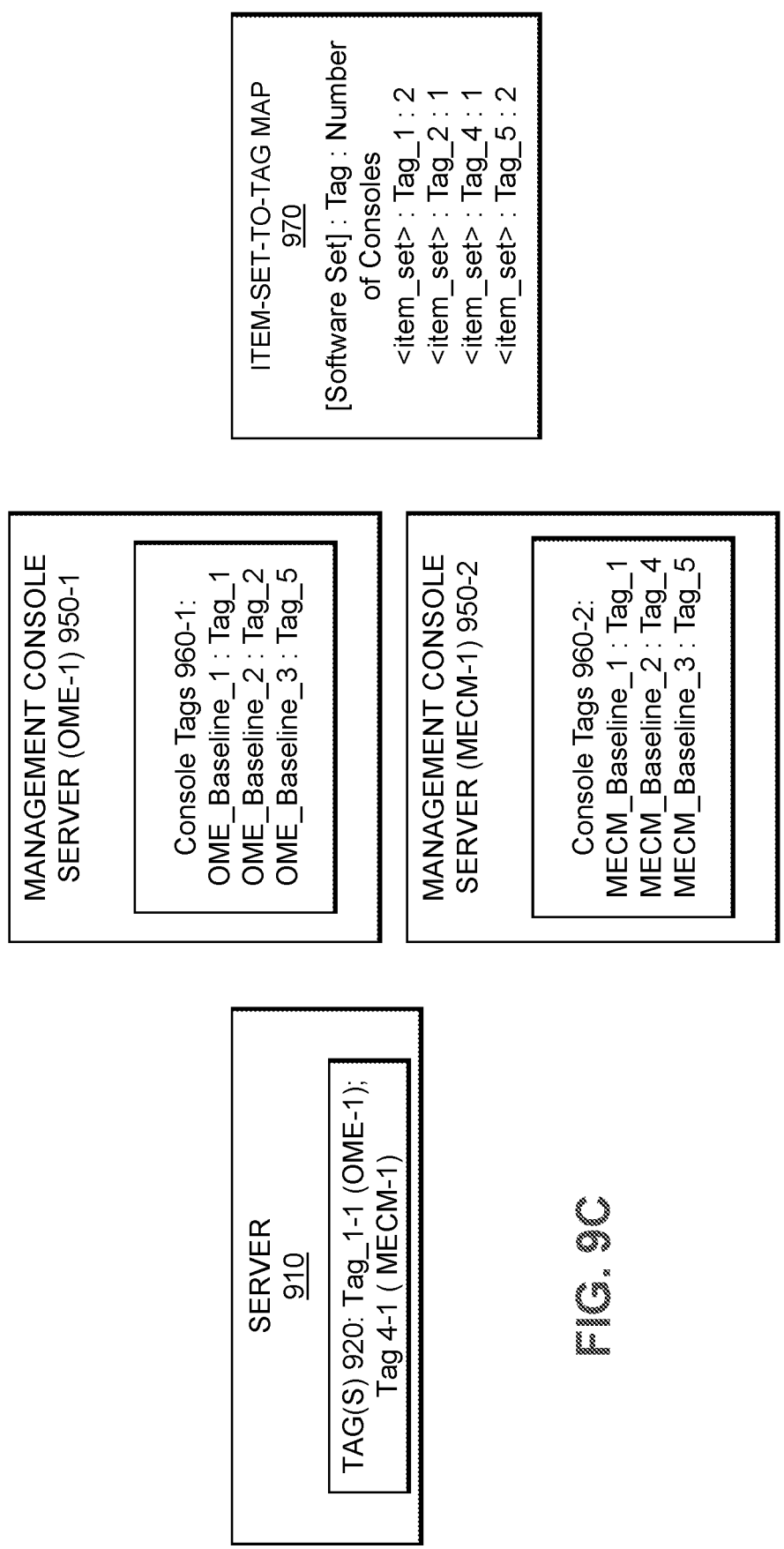

FIGS. 9A through 9D illustrate a number of sequential server device updates applied by one or more management console servers using the disclosed tagged update baselines, in accordance with at least one embodiment of the disclosure. As noted above, each subsequent applied tag supersedes the prior tag, in at least some embodiments. As shown in FIG. 9A, an update of a server 910 is initially performed by a first management console server 950-1 (e.g., an OME-1 console), having two console tags 960-1, Tag_1 and Tag_2, for corresponding OME baselines 1 and 2. Tag_1 is applied in FIG. 9A and the resulting state of the server 910 is shown, comprising a set of tags 920 that includes Tag-1-1 from the management console server 950-1. An item set-to-tag map 970 comprises Tag_1 and Tag_2, each with a count of one.

As shown in FIG. 9B, a second management console server 950-2 is added and a baseline of the second management console server 950-2 (e.g., an MECM console) will be applied to the server 910 with tag reconciliation. The second management console server 950-2 has two console tags 960-2, Tag_1 and Tag_4 for corresponding MECM baselines 1 and 2. In the example of FIG. 9B, the second management console server 950-2 places the server 910 in a maintenance mode and updates the server 910 with MECM baseline 1 (corresponding to Tag_1). The update is allowed since the same Tag_1 is available for both consoles 950-1 and 950-2, with the resulting state of the server 910 comprising a set of tags 920 that includes Tag-1-1 from the management console server 950-1 and Tag-1-1 from the management console server 950-2. The item set-to-tag map 970 comprises Tag_1, Tag_2 and Tag_4, with respective counts of 2, 1, 1.

As shown in FIG. 9C, the MECM console 950-2 places the server 910 in a maintenance mode and attempts to update the server with MECM baseline 2 (corresponding to Tag 4). The server state then comprises Tag_1-1 and Tag 4-1. Thus, Tag 4-1 is applied, but the server 910 cannot be taken out of maintenance mode since different tags are available (e.g., more than one tag is active for the server 910).

Figure 9D:
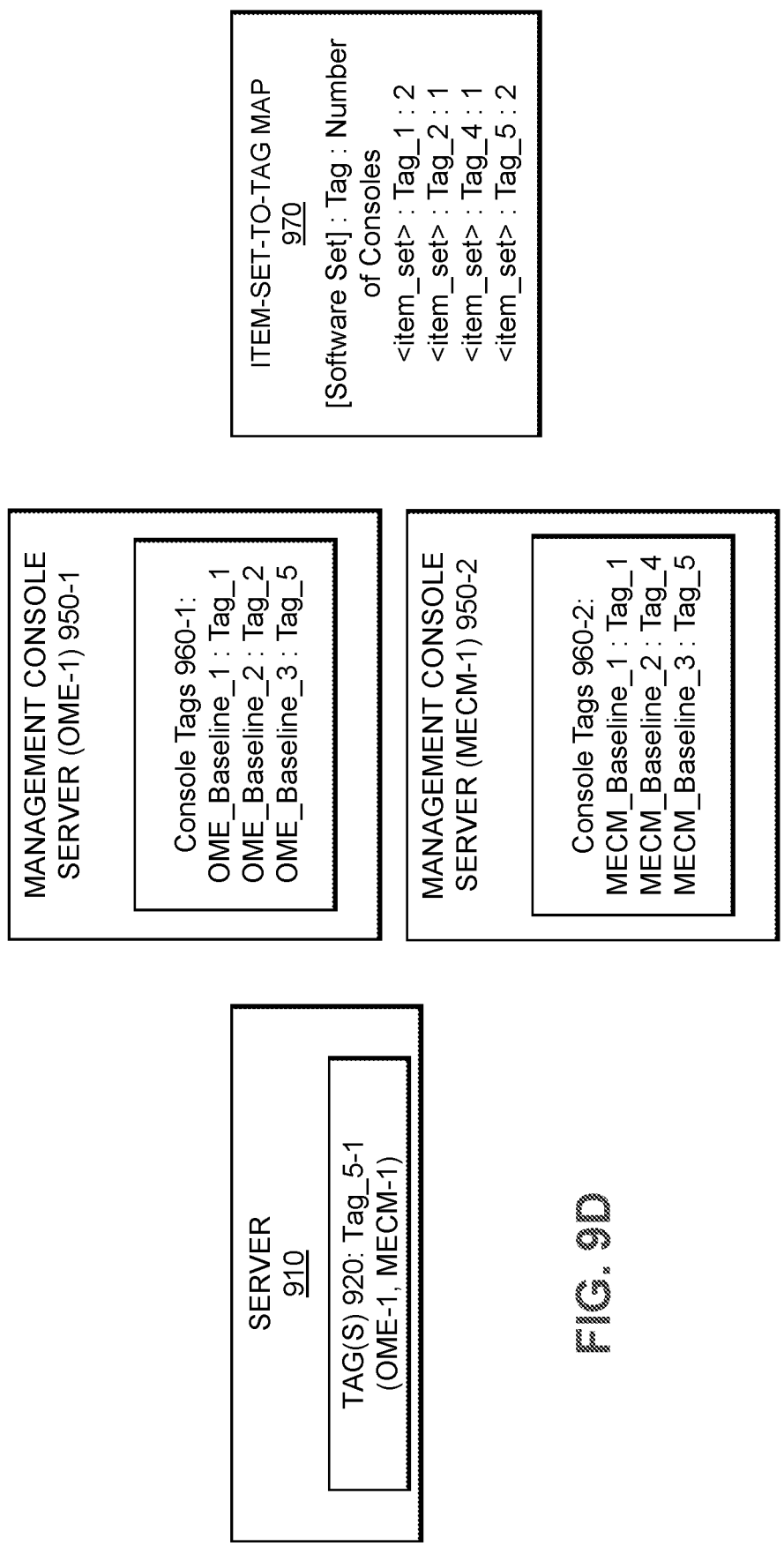

In the example of FIG. 9D, the MECM baseline 3 (corresponding to Tag_5) and the OME baseline 3 (also corresponding to Tag_5) are updated. After the update, the state in server 910 comprises Tag_5-1. Tag_4-1 is overridden by virtue of writing the more recent Tag_5-1. The update is allowed since the same tag is available for all consoles (e.g., only one tag is active for the server 910), and the server 910 can be moved out of maintenance mode into an operational mode.

FIG. 10 is a flow chart illustrating an exemplary implementation of a server device update process 1000 that applies tagged update baselines associated with multiple management console servers to one or more server devices in accordance with an illustrative embodiment. In the example of FIG. 10, the server device update process 1000 initially obtains, by a first management console of a plurality of management consoles associated with at least one server device, a first update baseline in step 1002 comprising a first tag identifier, of a plurality of tag identifiers, that identifies a first update of at least one component of the at least one server device across one or more of the plurality of management consoles.

The first management console then applies the first update baseline comprising the first tag identifier in step 1004 to the at least one server device in a maintenance mode to update the at least one component of the at least one server device, wherein the at least one server device is maintained in the maintenance mode in response to two or more of the plurality of the tag identifiers being active in the at least one server device following the applying the first update baseline to the at least one server device.

In some embodiments, the at least one server device is restored from the maintenance mode in response to only one of the plurality of tag identifiers being active in the at least one server device following the applying the first update baseline.

The tag identifiers may be generated in some embodiments by: processing a plurality of update baselines from the plurality of management consoles to identify the at least one component of the at least one server device in the plurality of update baselines, and a corresponding version and identifier of each at least one component of the at least one server device; identifying repeated instances of one or more of the at least one component of the at least one server device, using at least one of the corresponding version and the identifier of each at least one component, across the plurality of update baselines; and associating a same tag identifier of the plurality of tag identifiers to each update baseline comprising a given repeated instance of a given at least one component. A different tag identifier can be assigned to one or more update baselines that do not comprise a given repeated instance of a given at least one component.

The particular processing operations and other functionality described in conjunction with FIGS. 6, 8 and 10 are presented by way of illustrative example only, and should not be construed as limiting the scope of the disclosure in any way. Alternative embodiments can use other types of processing operations for performing server device updates using tagged update baselines. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

For additional details related to management, configuration, update, security, deployment and/or processing of infrastructure stacks, see, for example, U.S. patent application Ser. No. 17/586,099, filed Jan. 27, 2022, entitled "Identifying and Mitigating Security Vulnerabilities in Multi-Layer Infrastructure Stacks," U.S. patent application Ser. No. 17/586,112, filed Jan. 27, 2022, entitled "Generating Multi-Layer Configuration Templates for Deployment Across Multiple Infrastructure Stack Layers," 5); and/or U.S. patent application Ser. No. 17/586,124, filed Jan. 27, 2022, entitled "Semantic-Aware Workflow Creation and Execution," each filed contemporaneously herewith and incorporated by reference herein in its entirety.

One or more embodiments of the disclosure provide improved methods, apparatus and computer program products for server device updates using update baselines tagged across multiple management console servers. The foregoing applications and associated embodiments should be considered as illustrative only, and numerous other embodiments can be configured using the techniques disclosed herein, in a wide variety of different applications.

It should also be understood that the disclosed server device update techniques using tagged update baselines, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for server device updates using tagged update baselines may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based update baseline tagging engine, or portions thereof, are illustratively implemented for use by tenants of such a multi-tenant environment.

Virtual machines provided in cloud-based systems can be used to implement at least portions of a cloud-based update baseline tagging platform in illustrative embodiments. The cloud-based systems can include, for example, object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. These platforms may also be used to implement at least portions of other information processing systems in other embodiments.

Figure 11:
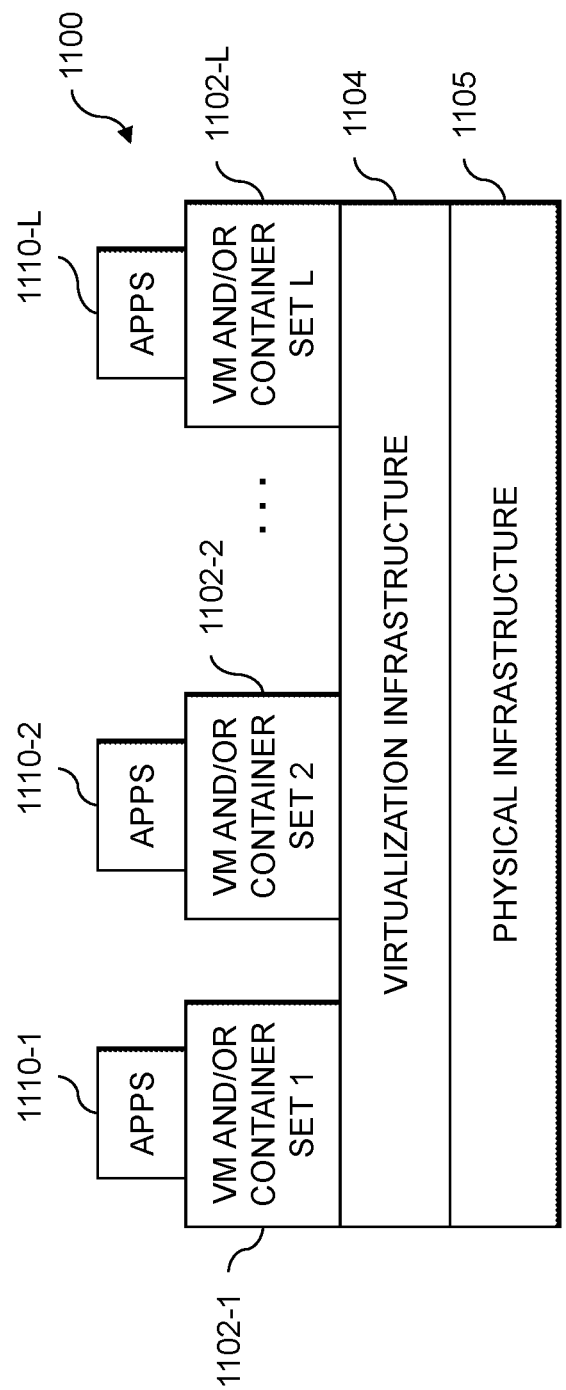
FIG. 11 illustrates an exemplary processing platform that may be used to implement at least a portion of one or more embodiments of the disclosure comprising a cloud infrastructure.

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide update baseline tagging functionality of the type described above for one or more processes running on a given one of the VMs. For example, each of the VMs can implement update baseline tagging control logic and server update functionality for one or more processes running on that particular VM.

An example of a hypervisor platform that may be used to implement a hypervisor within the virtualization infrastructure 1104 is the VMware® vSphere® which may have an associated virtual infrastructure management system such as the VMware® vCenter™. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide update baseline tagging functionality of the type described above for one or more processes running on different ones of the containers. For example, a container host device supporting multiple containers of one or more container sets can implement one or more instances of update baseline tagging control logic and associated server update functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a WAN, a LAN, a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a CPU, a GPU, a TPU, a microcontroller, an ASIC, an FPGA or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Figure 12:
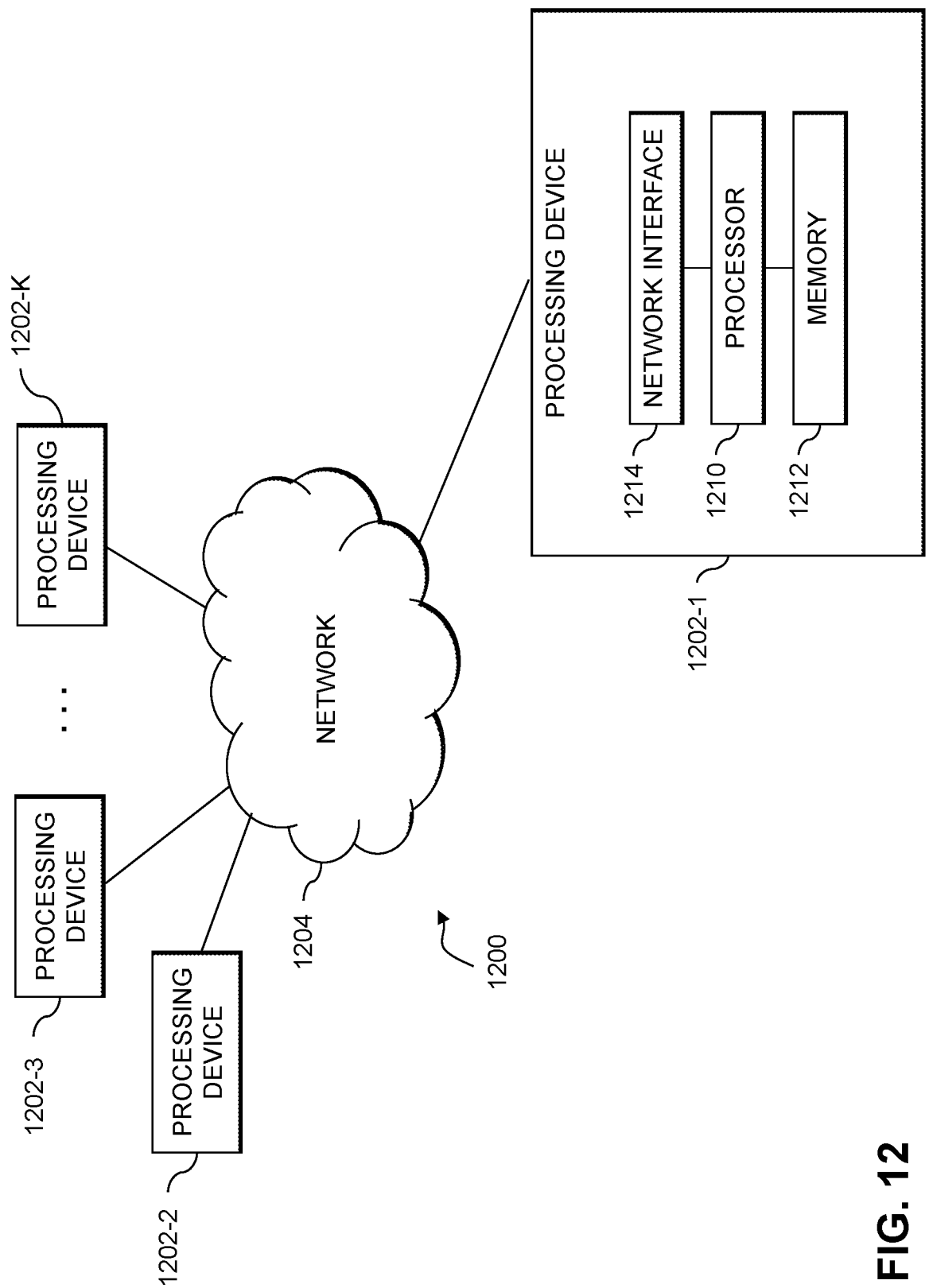
FIG. 12 illustrates another exemplary processing platform that may be used to implement at least a portion of one or more embodiments of the disclosure.

Multiple elements of an information processing system may be collectively implemented on a common processing platform of the type shown in FIG. 11 or 12, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, by a first management console of a plurality of management consoles associated with at least one server device, a first update baseline comprising a first tag identifier, of a plurality of tag identifiers, that identifies a first update of at least one component of the at least one server device across one or more of the plurality of management consoles; and
updating the at least one component of the at least one server device by applying, by the first management console, the first update baseline comprising the first tag identifier to the at least one server device in a maintenance mode, wherein the at least one server device is maintained in the maintenance mode in response to a same tag identifier not being available for the plurality of management consoles following the applying the first update baseline to the at least one server device;
wherein the method is performed by at least one processing device comprising a processor coupled to a memory.

2. The method of claim 1, further comprising restoring the at least one server device from the maintenance mode in response to only one of the plurality of tag identifiers being active in the at least one server device following the applying the first update baseline.

3. The method of claim 1, wherein the plurality of tag identifiers is generated by: processing a plurality of update baselines from the plurality of management consoles to identify the at least one component of the at least one server device in the plurality of update baselines, and a corresponding version and identifier of each at least one component of the at least one server device; identifying repeated instances of one or more of the at least one component of the at least one server device, using at least one of the corresponding version and the identifier of each at least one component, across the plurality of update baselines; and associating a same tag identifier of the plurality of tag identifiers to each update baseline comprising a given repeated instance of a given at least one component.

4. The method of claim 3, further comprising assigning a different tag identifier to one or more update baselines that do not comprise a given repeated instance of a given at least one component.

5. The method of claim 1, further comprising, for a given tag identifier, placing the at least one server device in the maintenance mode; initiating each of the plurality of management consoles having an update baseline comprising the given tag identifier to apply the update baseline comprising the given tag identifier to the at least one server device; and restoring the at least one server device from the maintenance mode in response to only the given tag identifier being active in the at least one server device following the applying of the update baseline comprising the given tag identifier.

6. The method of claim 1, further comprising retiring one or more of a plurality of update baselines having at least one of a demoted at least one component and a non-validated at least one component.

7. The method of claim 1, further comprising storing, for each tag identifier of the plurality of tag identifiers, an identifier of each update baseline comprising the respective tag identifier and an identifier of a corresponding management console associated with the update baseline comprising the respective tag identifier.

8. An apparatus comprising:
at least one processing device comprising a processor coupled to a memory;
the at least one processing device being configured to implement the following steps:
obtaining, by a first management console of a plurality of management consoles associated with at least one server device, a first update baseline comprising a first tag identifier, of a plurality of tag identifiers, that identifies a first update of at least one component of the at least one server device across one or more of the plurality of management consoles; and
updating the at least one component of the at least one server device by applying, by the first management console, the first update baseline comprising the first tag identifier to the at least one server device in a maintenance mode, wherein the at least one server device is maintained in the maintenance mode in response to a same tag identifier not being available for the plurality of management consoles following the applying the first update baseline to the at least one server device.

9. The apparatus of claim 8, further comprising restoring the at least one server device from the maintenance mode in response to only one of the plurality of tag identifiers being active in the at least one server device following the applying the first update baseline.

10. The apparatus of claim 8, wherein the plurality of tag identifiers is generated by: processing a plurality of update baselines from the plurality of management consoles to identify the at least one component of the at least one server device in the plurality of update baselines, and a corresponding version and identifier of each at least one component of the at least one server device; identifying repeated instances of one or more of the at least one component of the at least one server device, using at least one of the corresponding version and the identifier of each at least one component, across the plurality of update baselines; associating a same tag identifier of the plurality of tag identifiers to each update baseline comprising a given repeated instance of a given at least one component; and assigning a different tag identifier to one or more update baselines that do not comprise a given repeated instance of a given at least one component.

11. The apparatus of claim 8, further comprising, for a given tag identifier, placing the at least one server device in the maintenance mode; initiating each of the plurality of management consoles having an update baseline comprising the given tag identifier to apply the update baseline comprising the given tag identifier to the at least one server device; and restoring the at least one server device from the maintenance mode in response to only the given tag identifier being active in the at least one server device following the applying of the update baseline comprising the given tag identifier.

12. The apparatus of claim 8, further comprising retiring one or more of a plurality of update baselines having at least one of a demoted at least one component and a non-validated at least one component.

13. The apparatus of claim 8, further comprising storing, for each tag identifier of the plurality of tag identifiers, an identifier of each update baseline comprising the respective tag identifier and an identifier of a corresponding management console associated with the update baseline comprising the respective tag identifier.

14. A non-transitory processor-readable storage medium having stored therein program code of one or more software programs, wherein the program code when executed by at least one processing device causes the at least one processing device to perform the following steps:
obtaining, by a first management console of a plurality of management consoles associated with at least one server device, a first update baseline comprising a first tag identifier, of a plurality of tag identifiers, that identifies a first update of at least one component of the at least one server device across one or more of the plurality of management consoles; and
updating the at least one component of the at least one server device by applying, by the first management console, the first update baseline comprising the first tag identifier to the at least one server device in a maintenance mode, wherein the at least one server device is maintained in the maintenance mode in response to a same tag identifier not being available for the plurality of management consoles following the applying the first update baseline to the at least one server device.

15. The non-transitory processor-readable storage medium of claim 14, further comprising restoring the at least one server device from the maintenance mode in response to only one of the plurality of tag identifiers being active in the at least one server device following the applying the first update baseline.

16. The non-transitory processor-readable storage medium of claim 14, wherein the plurality of tag identifiers is generated by: processing a plurality of update baselines from the plurality of management consoles to identify the at least one component of the at least one server device in the plurality of update baselines, and a corresponding version and identifier of each at least one component of the at least one server device; and identifying repeated instances of one or more of the at least one component of the at least one server device, using at least one of the corresponding version and the identifier of each at least one component, across the plurality of update baselines; associating a same tag identifier of the plurality of tag identifiers to each update baseline comprising a given repeated instance of a given at least one component.

17. The non-transitory processor-readable storage medium of claim 16, further comprising assigning a different tag identifier to one or more update baselines that do not comprise a given repeated instance of a given at least one component.

18. The non-transitory processor-readable storage medium of claim 14, further comprising, for a given tag identifier, placing the at least one server device in the maintenance mode; initiating each of the plurality of management consoles having an update baseline comprising the given tag identifier to apply the update baseline comprising the given tag identifier to the at least one server device; and restoring the at least one server device from the maintenance mode in response to only the given tag identifier being active in the at least one server device following the applying of the update baseline comprising the given tag identifier.

19. The non-transitory processor-readable storage medium of claim 14, further comprising retiring one or more of a plurality of update baselines having at least one of a demoted at least one component and a non-validated at least one component.

20. The non-transitory processor-readable storage medium of claim 14, further comprising storing, for each tag identifier of the plurality of tag identifiers, an identifier of each update baseline comprising the respective tag identifier and an identifier of a corresponding management console associated with the update baseline comprising the respective tag identifier.

* * * * *